May 5, 1970     C. W. JACK     3,510,204

MAGNIFIED TWEEZER DEVICE

Filed April 13, 1967

INVENTOR.
CHARLES W. JACK
BY Howard C. Thompson
ATTORNEY

United States Patent Office 3,510,204
Patented May 5, 1970

---

3,510,204
MAGNIFIED TWEEZER DEVICE
Charles W. Jack, Old Chatham, N.Y., assignor to The Executive Line, Inc., Chatham, N.Y., a corporation of New York
Filed Apr. 13, 1967, Ser. No. 630,606
Int. Cl. G02b 7/02
U.S. Cl. 350—244         1 Claim

ABSTRACT OF THE DISCLOSURE

A tweezer, including a magnifying lens structure, coupled with the tweezer and incorporating a flexible shaft coupling for universal positioning of the lens structure with respect to the operating end of the tweezer and, wherein, the lens structure has a rotatable mounting in connection with the flexible shaft coupling.

BACKGROUND OF THE INVENTION (1) The invention deals with a device of the character defined which is simple and economical in construction and, further, by virtue of the flexible coupling of the two component parts, namely the lens and the tweezer, the device can be conveniently and practically handled when in use and, further, collapsed for packaging or storage in a carrying case. Further, the invention deals with a device of the character defined which facilitates movement of the lens into any desired angular position or location with respect to the tweezer tip, facilitating use of the tweezer while giving desired viewing of the object to be engaged by the tweezer.

(2) Generally speaking, lens structures have been associated with tweezers or similar instruments, but have been confined to movement in predetermined limited paths with respect to the instrument, as evidenced by the following United States patents: Boehm, 718,748; Cusimano, 1,516,955; Brustolon, 2,387,054; and Fleenor, 2,435,741. To applicant's knowledge, a device of the character defined employing the pivotal and universal mounting of a lens is new in the art.

SUMMARY OF THE INVENTION

With devices of the character described, difficulty has been experienced in properly positioning or locating a lens with respect to the work being operated upon by the tweezer to give the desired vision by viewing from different angles and, particularly, in positioning the lens at sides of the tweezer tip for clear viewing of the object sought to be engaged by the tweezer tip. With applicant's device, these objectives can be accomplished by virtue of the novel mounting of the lens structure in connection with the tweezer.

The novel features of the invention will be best understood from the following description, when taken together with the accompanying drawing, in which certain embodiments of the invention are disclosed and, in which, the separate parts are designated by suitable reference characters in each of the views and, in which.

Figure 1:
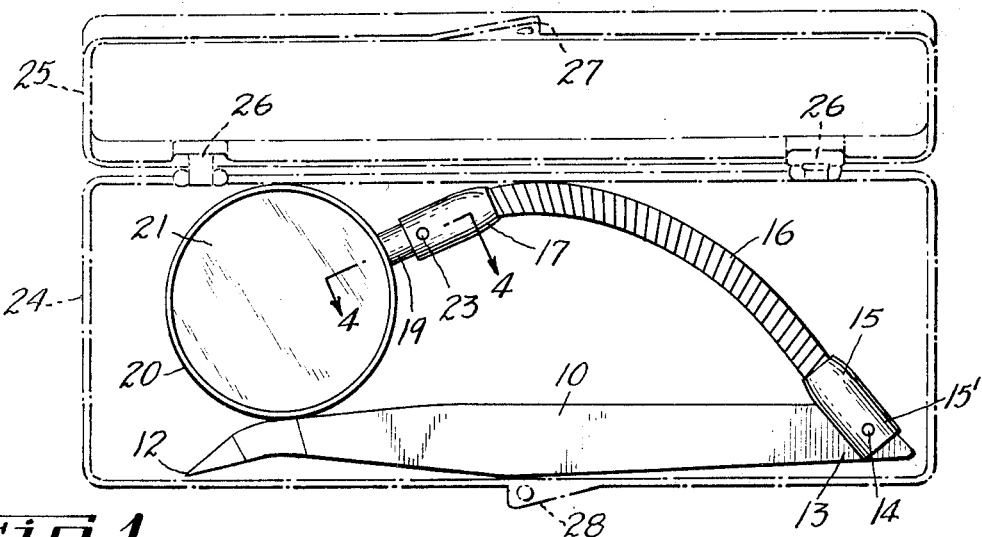
FIG. 1 is a plan view of a device made according to my invention in a collapsed state, facilitating packaging or positioning in a container or carrying case, such as indicated in dot-dash lines in said figure.
Figure 2:
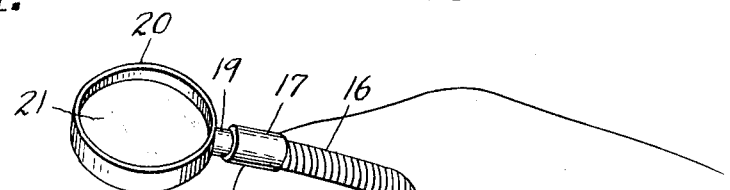
FIG. 2 is a diagrammatic view illustrating one of numerous positions of the device as supported in a hand.
Figure 4:
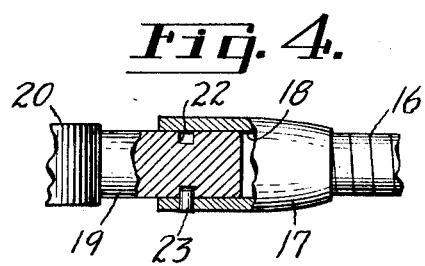
FIG. 4 is an enlarged detail sectional view substantially on the line 4—4 of FIG. 1.

Considering FIGS. 1 and 2 of the drawing, the device comprises a more or less conventional type of tweezer 10, having normally flared and generally similar side members 11, as clearly seen in FIG. 2, having offset contracted or pointed ends 12, which are brought together in the engagement of a member to be grasped by compression of the sides 11, as diagrammatically illustrated by the showing of a hand in FIG. 2 of the drawing. In other words, the sides 11 are normally tensioned to be spread apart substantially to the degree illustrated. At the other end 13 of the tweezer, the members 11 are either in close proximity to each other or are integrally joined in a solid wall portion. The end 13 supports a pivot pin 14, upon which a yoke-shaped coupling member 15 is pivotally mounted. It will be understood that the member 15 has wall portions on each side of the tweezer and one side wall portion only is seen at 15', but the opposed side wall will naturally be of the same structure. The coupling member facilitates free swinging movement on the end 13, as diagrammatically illustrated in FIG. 1. Coupled with and extending from the member 15 is a tubular flexible shaft 16, to the end of which is fixed a socket 17, having a bore 18, as clearly noted in FIG. 4 of the drawing.

At 19 is shown a pin welded or soldered to a rim 20 supporting a magnifying lens 21, as clearly illustrated in FIGS. 1 and 2. The pin 19 is frictionally supported in the bore 18 and the pin has an annular groove 22 engaged by a screw or pin 23 fixed in the socket 17 to permit frictional rotary movement of the lens structure in the socket to position the lens in any circumferential position with respect to the socket.

Considering FIG. 1 of the drawing, it will be apparent that the device in an assembled state, in other words, with the lens structure in the position shown with respect to the pointed end portion of the tweezer, facilitates packaging of the device for shipment and/or for positioning in a suitable carrying case, for example, in a case part 24, shown in dot-dash lines, the case part having a cover part 25 hinged to 24, as seen at 26, and the cover part has snap means 27 for engaging similar means 28 on the case part in holding the cover in closed position. In this manner, the relatively thin assemblage of the device can be retained in a relatively thin carrying case for support in a pocket, pocketbook or the like, generally similar to an eyeglass case. Thus, the device becomes available for use at all times. The foregoing will be apparent, keeping in mind that the overall thickness of the device is within the limits of the width of the lens rim 20 and the diameter of the coupling member 15 when the parts are in the position as shown in FIG. 1.

Figure 3:
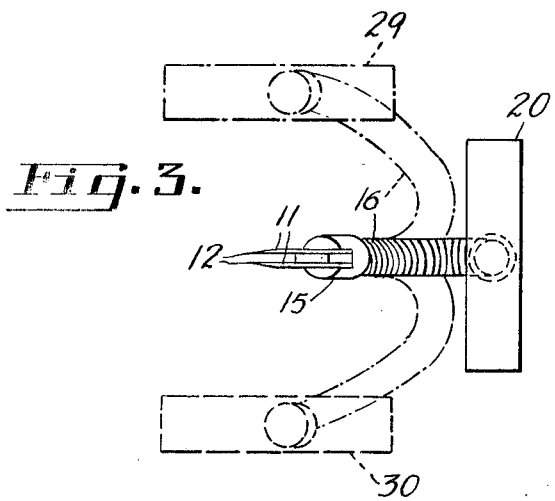
FIG. 3 is an edge view of the device showing the lens substantially in the position as viewed in FIG. 2 and illustrating in dot-dash lines further positioning of the lens with respect to the working tip of the tweezer.

Turning now to the diagrammatic showing in FIG. 3 of the drawing, this view is to primarily illustrate at least some of the range of universal movement of the lens assemblage with respect to the tips 12 of the tweezer and, particularly, in bringing the lens assemblage at either side of the tips 12, for example, as seen at 29 and 30 in dotted or dot-dash lines.

Very often, it is desirable to view the object to be engaged by the tweezer from the side of the support in which the object is located to enable the tweezer points 12 to properly engage the object in removal of the same from the support.

The tubular flexible shaft 16 serves to maintain the lens assemblage in any desired position of adjustment with respect to the tweezer tips 12 and with the lens assemblage, as well as the flexible shaft, positioned at either side edge of the tweezer in the illustrations in FIGS. 1 and 2, the location is on what might be termed the upper edge portion of the tweezer, but it can be located on the lower end portion of the tweezer, keeping in mind that the coupling member 15 is swingable onto both edge portions of the tweezer.

Having fully described my invention, what I claim as new and desire to secure by Letters Patent is:

1. A pocket tweezer and magnifier comprising a tweezer having a pivot end portion and a flared end portion having pointed tips, a tubular coupling member having a yoke-shaped end defined by sides overlapping and pivotally supported on the first named end of the tweezer, means including a tubular flexible shaft fixed to said member for universally supporting a magnifying lens assemblage in connection with said member and tweezer, said assemblage comprising a rimmed magnifying lens having a radially extending pin, a socket on the free end of said flexible shaft rotatably receiving said pin, said pin having an annular groove therein, said socket having an inwardly projecting member registering with said groove to thereby key said pin against longitudinal movement in said socket, and the combined adjustments provided by said flexible shaft and the pin and socket of said lens assemblage facilitating accurate focusing adjustment of said magnifying lens with respect to the pointed tips of the tweezer in varied positions of swinging movement of said magnifying lens assemblage about said tips.

References Cited

UNITED STATES PATENTS

| 718,748 | 1/1903 | Boehm | 350—244 |
| 1,765,366 | 6/1930 | Crater | 350—244 |
| 1,783,278 | 12/1930 | Brady. | |

FOREIGN PATENTS

| 1,073,250 | 1954 | France. |

DAVID SCHONBERG, Primary Examiner

M. J. TOKAR, Assistant Examiner